United States Patent
Soloway

(10) Patent No.: US 9,651,024 B2
(45) Date of Patent: May 16, 2017

(54) ROTOR BLADE ASSEMBLY HAVING INTERNAL LOADING FEATURES

(71) Applicant: General Electric Company, Schenectady, NY (US)

(72) Inventor: Daniel David Soloway, Greenville, SC (US)

(73) Assignee: General Electric Company, Schenectady, NY (US)

( * ) Notice: Subject to any disclaimer, the term of this patent is extended or adjusted under 35 U.S.C. 154(b) by 502 days.

(21) Appl. No.: 14/251,752

(22) Filed: Apr. 14, 2014

(65) Prior Publication Data

US 2015/0292478 A1    Oct. 15, 2015

(51) Int. Cl.
   *F01D 5/00* (2006.01)
   *F03D 1/06* (2006.01)

(52) U.S. Cl.
   CPC ...... *F03D 1/0675* (2013.01); *F05B 2240/311* (2013.01); *F05B 2240/312* (2013.01); *Y02E 10/721* (2013.01)

(58) Field of Classification Search
   CPC ............... Y02E 10/721; F03D 1/0675; F05B 2240/311; F05B 2240/312
   USPC .............. 416/23, 24, 51, 52, 145, 144
   See application file for complete search history.

(56) References Cited

U.S. PATENT DOCUMENTS

| | | | | |
|---|---|---|---|---|
| 5,456,579 A * | 10/1995 | Olson | ............... | F03D 7/0252 416/23 |
| 7,517,198 B2 * | 4/2009 | Baker | ............... | F03D 1/0675 416/227 R |
| 8,029,240 B2 * | 10/2011 | Cawthorne | ............... | B64C 27/008 416/134 A |
| 8,297,928 B2 * | 10/2012 | Manfredotti | ............... | B64C 27/001 416/145 |
| 2008/0145221 A1 * | 6/2008 | Sun | ............... | B64C 27/615 416/23 |
| 2009/0252608 A1 * | 10/2009 | Metivier | ............... | G01M 1/36 416/1 |
| 2009/0317251 A1 * | 12/2009 | Tsou | ............... | F03D 3/005 416/51 |
| 2011/0103965 A1 * | 5/2011 | Mathew | ............... | F03D 1/065 416/233 |

(Continued)

OTHER PUBLICATIONS

Co-pending U.S. Appl. No. 13/664,603, filed Oct. 31, 2012.

(Continued)

*Primary Examiner* — Jessica Cahill

(74) *Attorney, Agent, or Firm* — Dority & Manning, P.A.

(57) ABSTRACT

Rotor blade assemblies and wind turbines are provided. A rotor blade assembly includes a rotor blade having exterior surfaces defining a pressure side, a suction side, a leading edge and a trailing edge each extending between a tip and a root, the rotor blade defining a span and a chord, the exterior surfaces defining an interior of the rotor blade. The rotor blade assembly further includes a loading assembly, the loading assembly including a weight disposed within the interior and movable generally along the span of the rotor blade, the weight connected to a rotor blade component such that movement of the weight towards the tip causes application of a force to the rotor blade component by the weight. Centrifugal force due to rotation of the rotor blade biases the weight towards the tip.

18 Claims, 6 Drawing Sheets

(56) References Cited

U.S. PATENT DOCUMENTS

| | | | | |
|---|---|---|---|---|
| 2012/0107116 A1* | 5/2012 | Obrecht | ................ | F03D 7/0296 |
| | | | | 416/1 |
| 2013/0276455 A1* | 10/2013 | Fisk | ......................... | F01D 5/16 |
| | | | | 60/805 |
| 2013/0294913 A1* | 11/2013 | Campbell | ................. | F01D 5/16 |
| | | | | 416/145 |

OTHER PUBLICATIONS

Co-pending U.S. Appl. No. 13/664,629, filed Oct. 31, 2012.
Co-pending U.S. Appl. No. 13/665,148, filed Oct. 31, 2012.
Co-pending U.S. Appl. No. 13/930,518, filed Jun. 28, 2013.

* cited by examiner

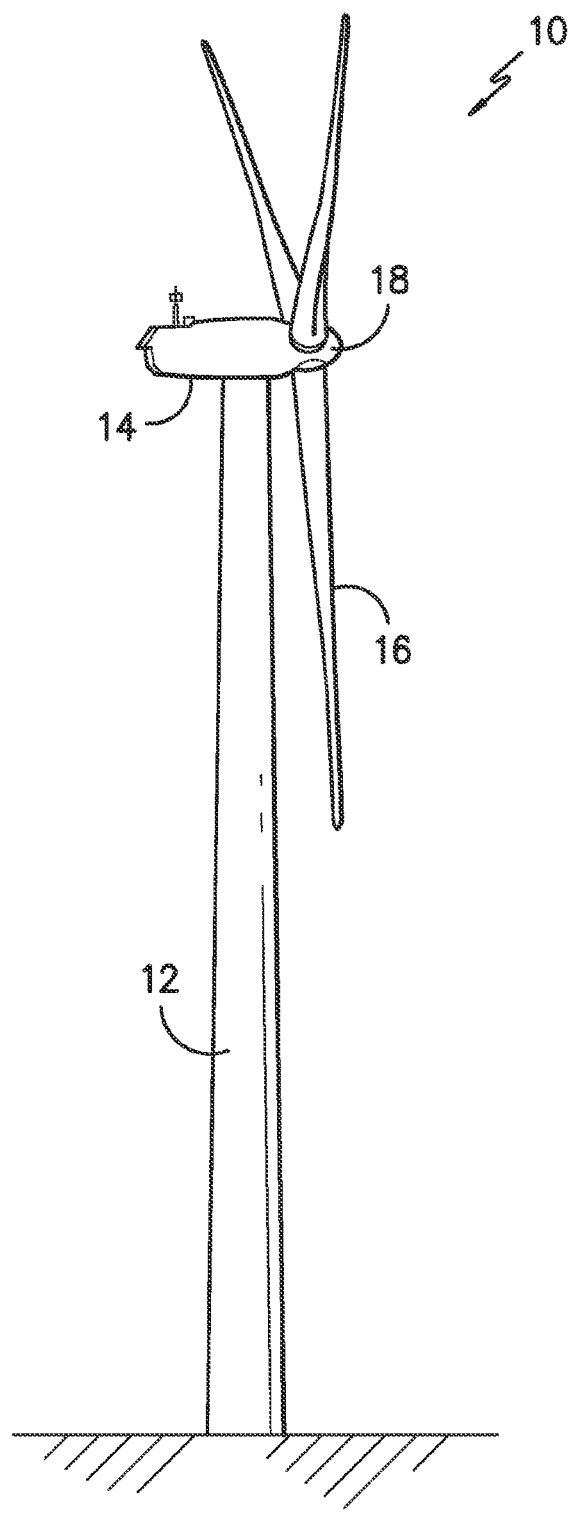
FIG. -1-

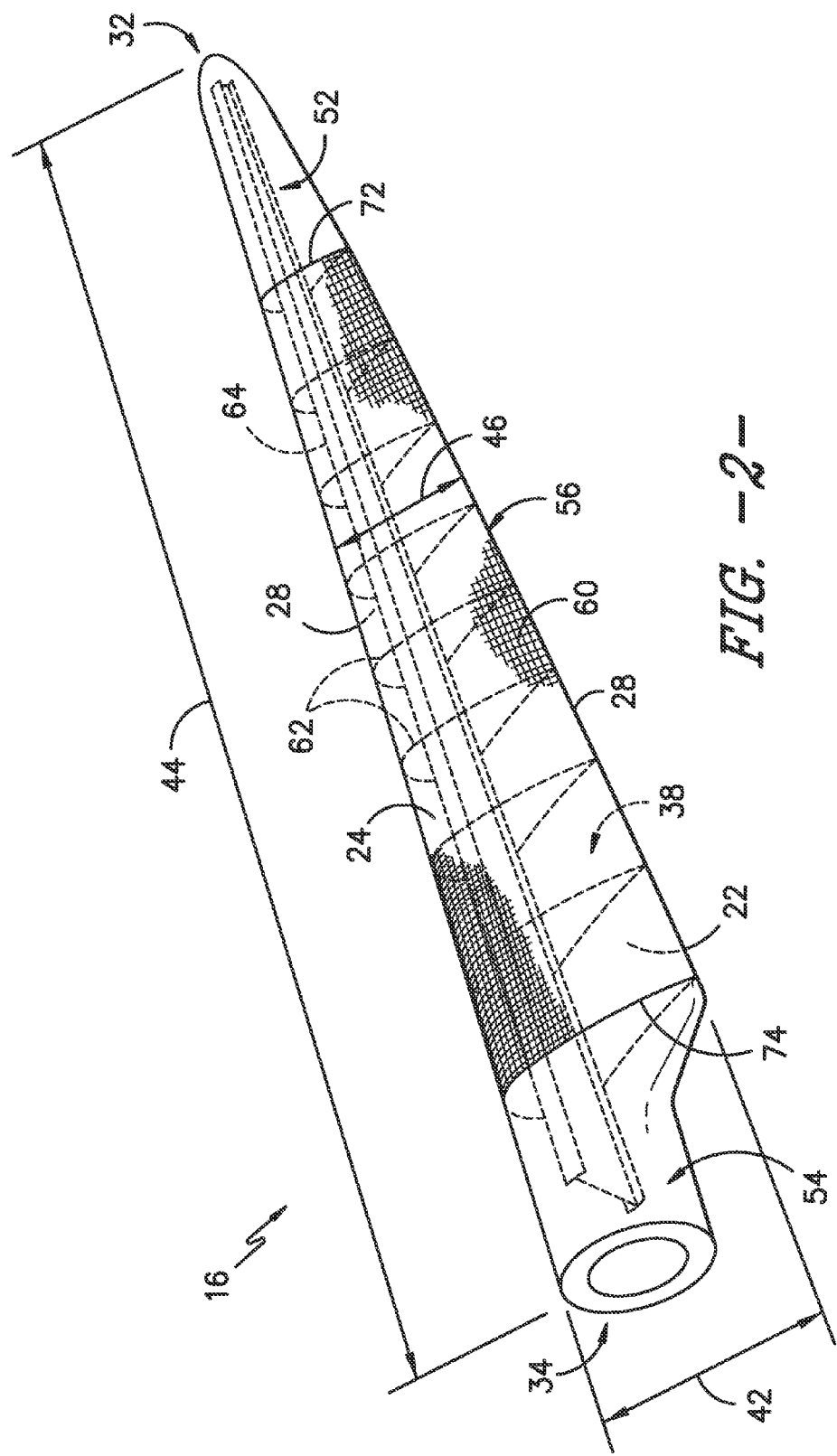
FIG. -2-

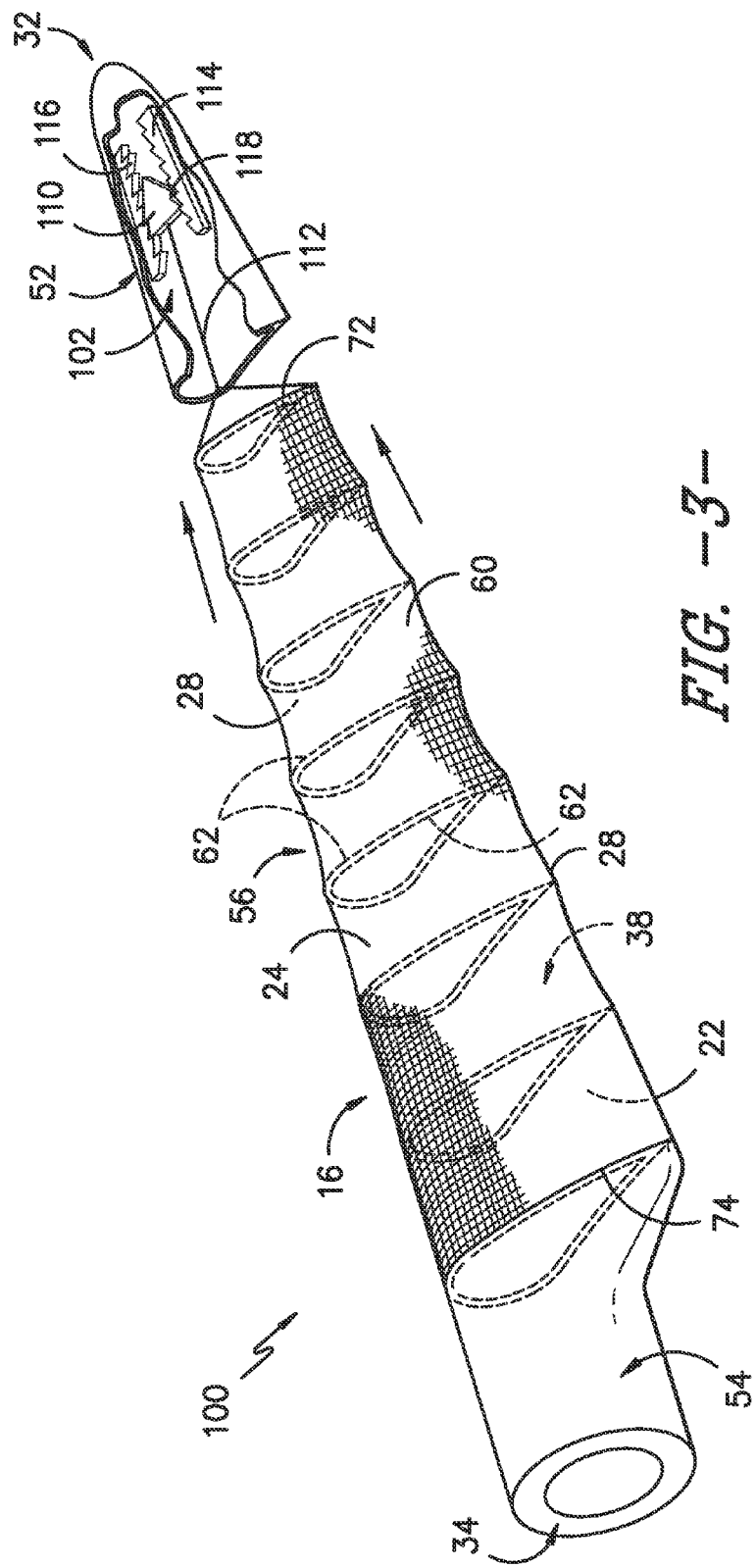
FIG. -3-

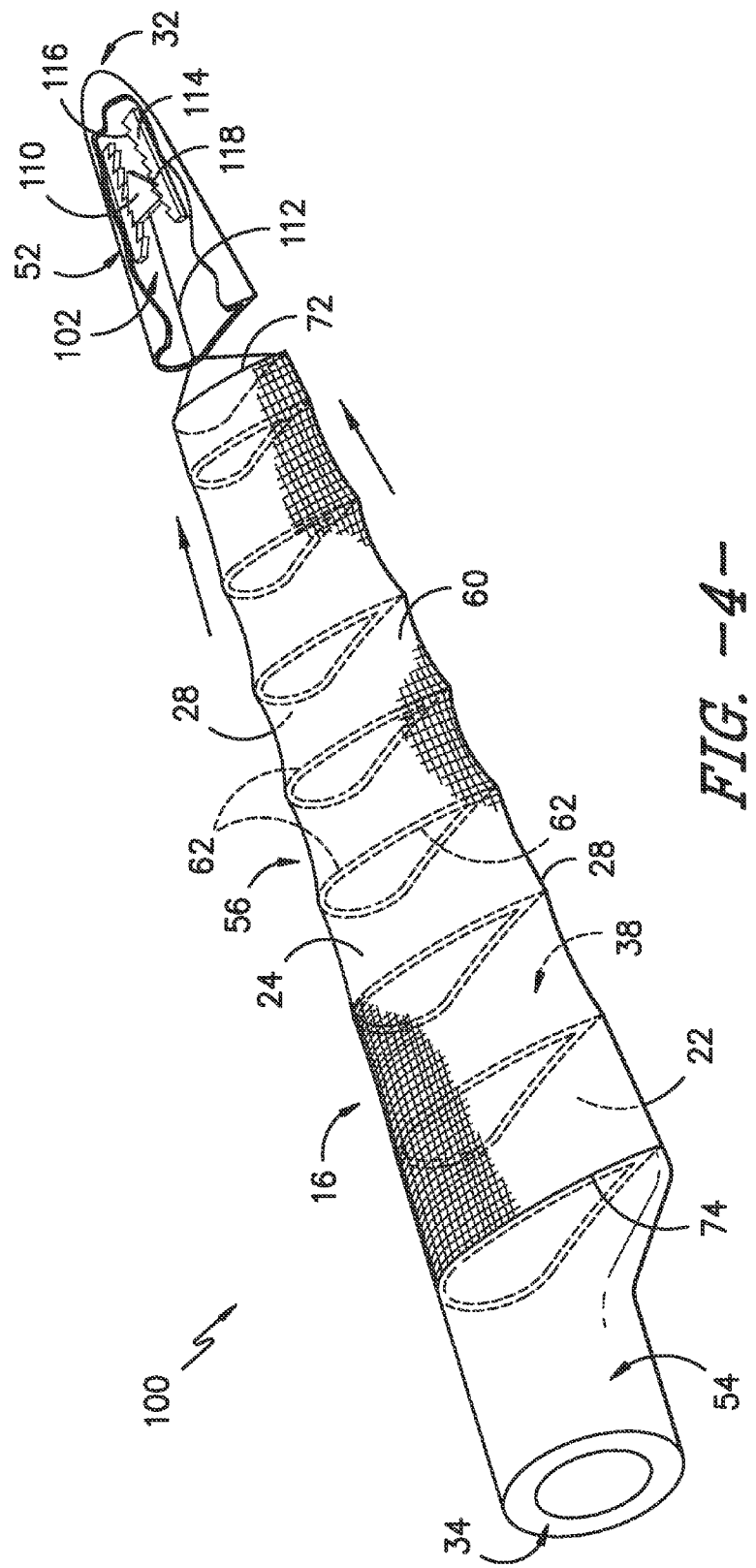

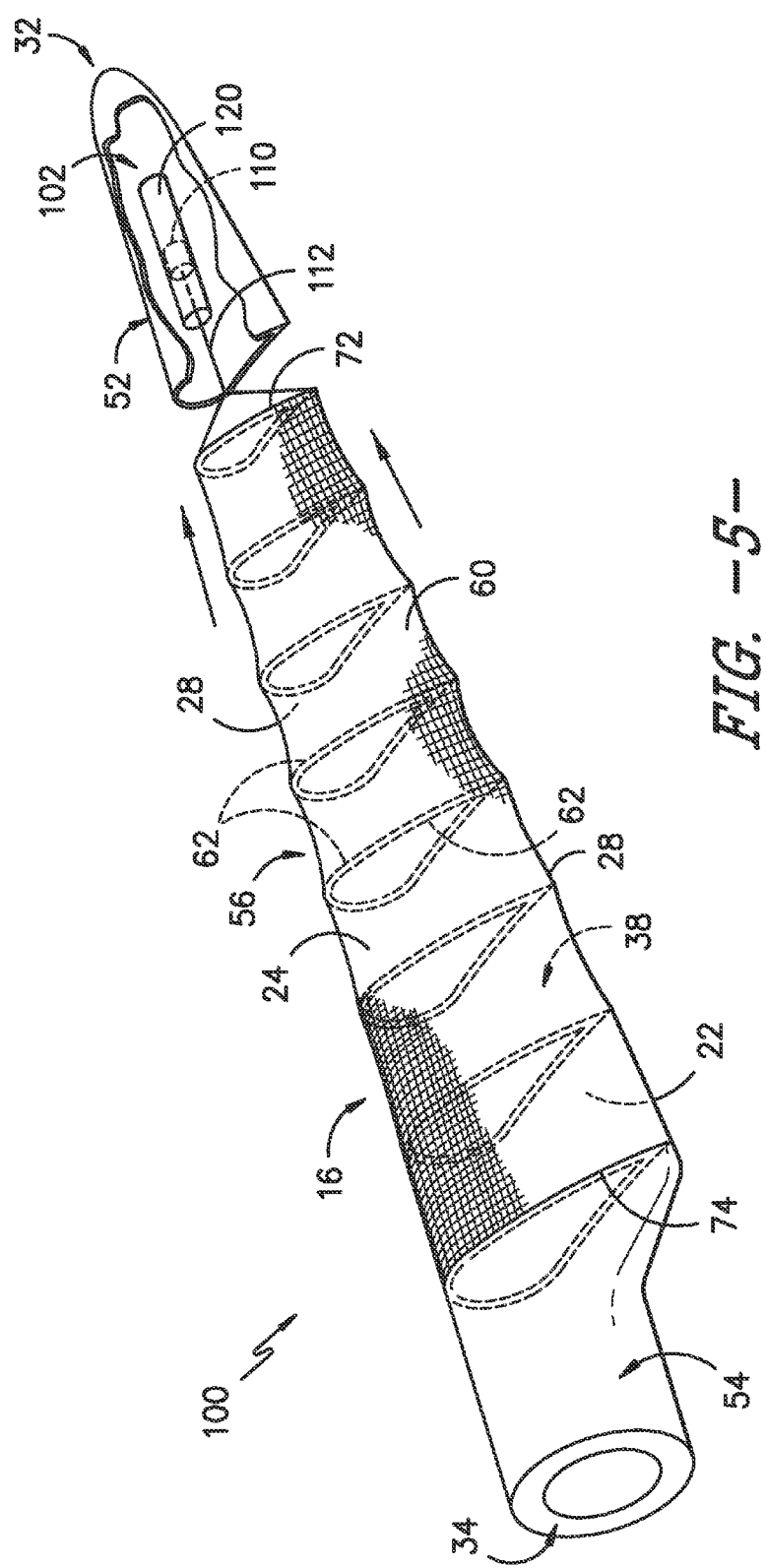
FIG. -5-

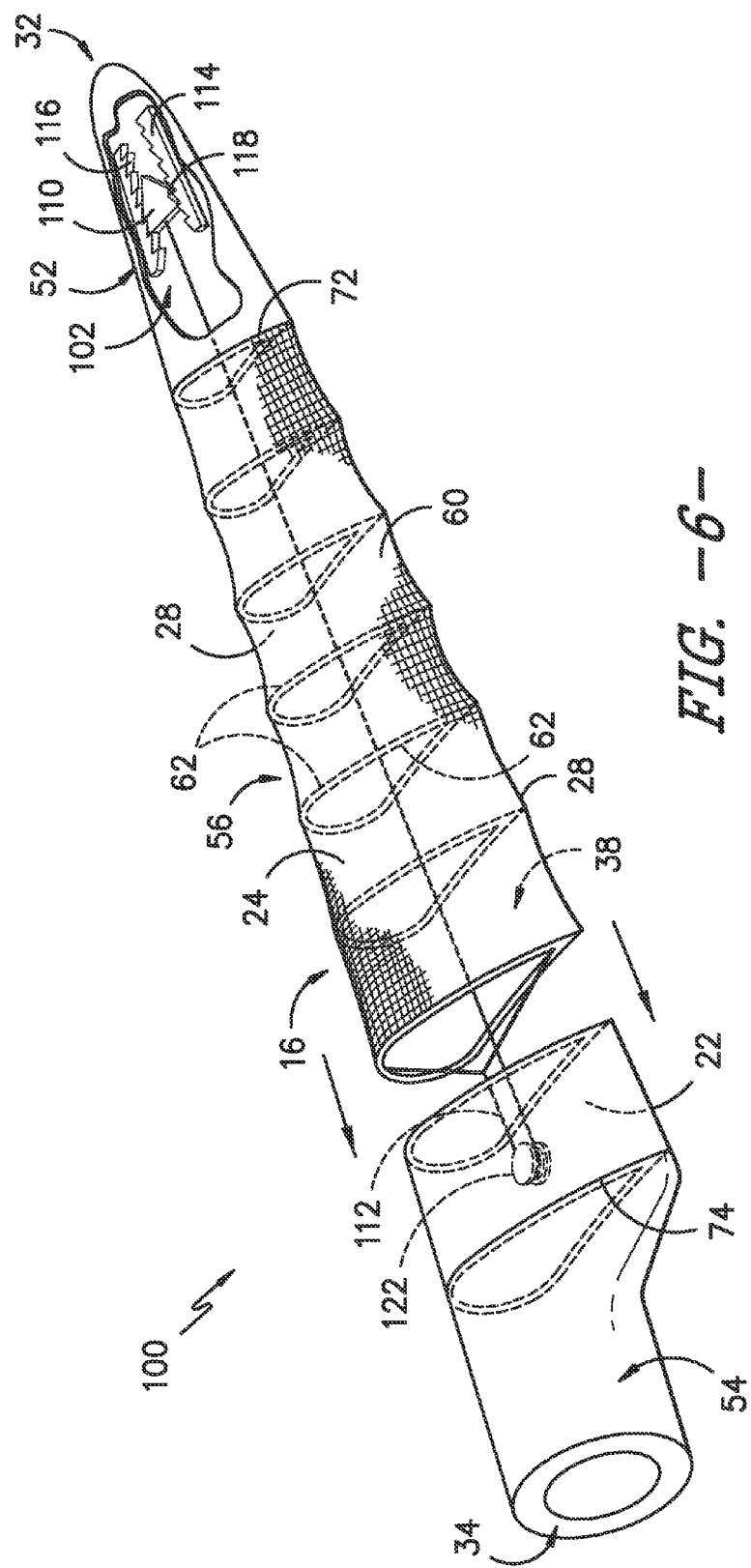
FIG. -6-

ROTOR BLADE ASSEMBLY HAVING INTERNAL LOADING FEATURES

This invention was made with government support under contract number DE-AR0000293 awarded by the Department of Energy. The government has certain rights in the invention.

FIELD OF THE INVENTION

The present disclosure relates in general to rotor blade assemblies for wind turbines, and more particularly to loading features utilized within rotor blades to apply forces to various rotor blade components.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

One concern during operation of a wind turbine is creep of various components, in particular rotor blade components. Over time, such components are subjected to various forces due to rotation of the rotor blades, and these forces can cause the components to deform.

Recently, developments in rotor blade construction have led to increased creep concerns. For example, recent developments have led to the introduction of fabrics used to form portions of the rotor blade skin, and thus the exterior surfaces of the rotor blade. Internal structural members may provide a skeleton and form the general aerodynamic shape of one or more portions of the rotor blade, and a fabric skin or a plurality of fabric panels can overlay or connect between the structural members. The fabric can be tensioned to provide this portion of the rotor blade skin with some rigidity. However, there have been concerns regarding the creep of the fabric during wind turbine operation.

Accordingly, improved rotor blade assemblies and features thereof which accommodate and adjust for creep and other movements of rotor blade components, such as fabrics, would be desired. In particular, internal loading assemblies which adjust for creep and other movements would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is provided. The rotor blade assembly includes a rotor blade having exterior surfaces defining a pressure side, a suction side, a leading edge and a trailing edge each extending between a tip and a root, the rotor blade defining a span and a chord, the exterior surfaces defining an interior of the rotor blade. The rotor blade assembly further includes a loading assembly, the loading assembly including a weight disposed within the interior and movable generally along the span of the rotor blade, the weight connected to a rotor blade component such that movement of the weight towards the tip causes application of a force to the rotor blade component by the weight. Centrifugal force due to rotation of the rotor blade biases the weight towards the tip.

In another embodiment, a rotor blade assembly is provided. The rotor blade assembly includes a rotor blade having exterior surfaces defining a pressure side, a suction side, a leading edge and a trailing edge each extending between a tip and a root, the rotor blade defining a span and a chord, the exterior surfaces defining an interior of the rotor blade. The rotor blade further includes a tip segment comprising the tip, a root segment comprising the root, and an intermediate segment between the tip segment and the root segment. The intermediate segment includes a fabric and a plurality of structural members. The rotor blade assembly further includes a loading assembly, the loading assembly operable to tension the intermediate segment during rotation of the rotor blade.

In another embodiment, a wind turbine is provided. The wind turbine includes a tower, a nacelle mounted on the tower, and a plurality of rotor blades. Each of the plurality of rotor blades has exterior surfaces defining a pressure side, a suction side, a leading edge and a trailing edge each extending between a tip and a root. Each of the plurality of rotor blades defining a span and a chord, and the exterior surfaces of each of the plurality of rotor blades defining an interior of each of the plurality of rotor blades. The wind turbine further includes a loading assembly, the loading assembly including a weight disposed within the interior of one of the plurality of rotor blades and movable generally along the span of the one of the plurality of rotor blades. The weight is connected to a rotor blade component such that movement of the weight towards the tip causes application of a force to the rotor blade component by the weight. Centrifugal force due to rotation of the one of the plurality of rotor blades biases the weight towards the tip.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a planform view of one embodiment of a rotor blade assembly of the present disclosure;

FIG. 3 is a perspective view of a rotor blade assembly, with cut-away portions to illustrate various internal components, in accordance with one embodiment of the present disclosure;

FIG. 4 is a perspective view of a rotor blade assembly, with cut-away portions to illustrate various internal components, in accordance with another embodiment of the present disclosure;

FIG. 5 is a perspective view of a rotor blade assembly, with cut-away portions to illustrate various internal components, in accordance with another embodiment of the present disclosure; and FIG. 6 is a perspective view of a rotor blade assembly, with cut-away portions to illustrate various internal components, in accordance with another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art. Further, the exterior surfaces may generally define an interior 38 of the rotor blade 16.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord 46 may be defined for the rotor blade 16 at any point on the rotor blade 16 along the span 44.

As discussed, the rotor blade 16 may be formed from a plurality of segments or be a singular, unitary blade. The blade, such as one or more segments thereof, may in some exemplary embodiments be formed from a suitable laminate, such as a fiberglass laminate. The laminate may form a skin of the rotor blade 16, which may include the exterior surfaces. Additionally or alternatively, the blade, such as one or more segments thereof, may be formed from other suitable materials. For example, in some embodiments, the blade, such as one or more segments thereof, may include a fabric which may at least partially define the exterior surfaces. Suitable fabric materials include, for example, woven fiberglass, canvas, cotton, polyester, nylon, or other suitable material(s). Notably, in some embodiments, the fabric may be coated and/or infused with another material, such as Teflon, silicone, polyvinyl, paint, UV protective coating, or other material(s).

Referring still to FIG. 2, one embodiment of the various segments utilized to form a rotor blade 16 is provided. As illustrated, rotor blade 16 may include a tip segment 52, a root segment 54, and an intermediate segment 56 disposed between the tip segment 52 and the root segment 54. The tip segment 52 may include, for example, the tip 32, and may extend in the span-wise direction from the tip 32 towards the root 34. The root segment 54 may include, for example, the root 34, and may extend in the span-wise direction from the root 34 towards the tip 32. The intermediate segment 56 may include a span-wise portion of the rotor blade 16 between the tip segment 52 and the root segment 54. Each segment 52, 54, 56 may include the exterior surfaces as discussed herein. Accordingly, at least a portion of each segment 52, 54, 56 may have a generally aerodynamic contour.

In exemplary embodiments, tip segment 52 and the root segment 54 are each formed from and thus include a suitable laminate, as discussed herein. Further, in exemplary embodiments, intermediate segment 56 may include a fabric 60, as discussed herein. Fabric 60 may be a fabric skin, or a plurality of separate fabric panels. Intermediate segment 56 may further include a plurality of structural members, which may provide the intermediate segment 56 with structural rigidity. For example, intermediate segment 56 may include a plurality of chord-wise extending structural members 62. These structural members 62 may be spaced apart from each other generally along the span 44, and may each have an outer generally aerodynamic contour which may define portions of the aerodynamic contour of the rotor blade 16. Intermediate segment 56 may further include one or more span-wise extending structural members 64. As illustrated, a span-wise extending structural member may for example have a generally I-shaped cross-sectional profile, and may for example include shear web and spar cap components. It should be noted that span-wise extending structural members 64 are not shown in FIGS. 3-6 for the sake of clarity, but may be utilized in such embodiments as desired or required. In some embodiments, fabric 60 may be attached to one or more of the structural members. For example, fabric panels may be attached between and to various structural members, or a fabric skin may encase and be attached to one or more structural members. In other embodiments, fabric 60 may be unattached to and movable relative to one or more of the structural members. For example, fabric skin may encase and move in the span-wise direction relative to various structural members.

Referring now to FIGS. 3 through 6, rotor blade 16 may be included in a rotor blade assembly 100. Rotor blade assembly 100 may include, for example, a rotor blade 16 and one or more loading assemblies 102. A loading assembly 102 may generally apply a force to one or more components of the rotor blade 16, referred to generally as rotor blade components. This force may, for example, advantageously cause the rotor blade component to move and/or adjust as required to compensate for creep, previous movement, etc. during operation of the wind turbine. In exemplary embodiments, the force may be a tensile force which may adjust the rotor blade component, re-tensioning such component and compensating for creep. Accordingly, loading assembly 102 may be operable to tension a rotor blade component, such as during rotation of the rotor blade 16. Notably, in exemplary embodiments loading assembly 102 advantageously applies such force passively, utilizing and harnessing centrifugal forces as the rotor blade 16 rotates during operation of the wind turbine. In alternative embodiments, however, loading assembly 102 may additionally or alternatively include active components to facilitate active applications of force to the rotor blade components. For example, a motor connected to a controller, such as the central wind turbine controller, may be utilized.

Loading assembly 102 includes, for example, a weight 110. Weight 110 may generally be disposed within the interior 38 of the rotor blade 16, such as in exemplary embodiments as illustrated within the tip segment 52. Weight 110 may have any suitable size, weight and mass, which may be optimized for a particular application and for a particular application of force. Weight 110 may be movable within the interior 38, such as generally along the span 44. During operation of the wind turbine 10 and due to rotation of the rotor blade 16, centrifugal force may be imparted by the weight 110. Advantageously, because the weight 110 is movable along the span 44, the application of such centrifugal force to the weight 110 may bias the weight 110 towards the tip 32. This bias may cause movement of the weight 110 as desired, and as discussed herein.

Weight 110 may be connected to a rotor blade component. Advantageously, movement of the weight towards the tip 32 may cause the application of a force to the rotor blade component by the weight 110. This application of force may cause movement of the rotor blade component. Advantageously, the weight 110, rotor blade component, etc. may be positioned and connected such that the movement of the rotor blade component may re-tension or re-position the rotor blade component, to compensate for undesirable creep or other movement of the rotor blade component that has occurred during wind turbine 10 operation.

In some embodiments, as illustrated for example in FIG. 4, the rotor blade component is the fabric 60. The weight 110 in these embodiments may be connected to the fabric 60, and may apply the force to the fabric 60 when moved due to centrifugal force. In other embodiments, as illustrated in FIGS. 3, 5 and 6, the rotor blade component is one of the structural members, such as one of the chord-wise extending structural members 62. The weight 110 in these embodiments may be connected to the structural member, and may apply the force to the structural member when moved due to centrifugal force.

Further, in exemplary embodiments, the force applied to the rotor blade component due to movement of the weight 110 may be a tensile force. In the case of the rotor blade component being the fabric 60 or a structural member or other component of the intermediate segment 56, such tensile force may advantageously tension the intermediate segment 56 as required. Notably, during operation, creep and/or other movements of a rotor blade component may gradually occur. Movement of the weight 110 may generally be passive, and may thus adjust the rotor blade component to accommodate for creep or other movement as required.

Notably, as illustrated in FIGS. 3-6, in embodiments wherein the rotor blade component is a component of the intermediate segment 56, the force from the weight 110 may be applied to segment 56 at an end, such as at a tip end 72 (FIGS. 3-5) or a root end 74 (FIG. 6). The weight 110 may for example be connected to the component at this end 72, 74. In exemplary embodiments, the other end 74, 72 may be generally fixed, such as fixedly connected to the root segment 54 (FIGS. 3-5) or the tip segment 52. This fixed connection facilitates tensioning of the intermediate segment 56 when a tensile force is applied.

It should be understood that rotor blade components in accordance with the present disclosure are not limited to the fabric 60, structural members, or other components of the intermediate segment 56. Rather, any suitable component of the rotor blade 16, including the tip segment 52, the root segment 54, and components thereof, such as internal components, are within the scope and spirit of the present disclosure. Additionally, it should be understood that the applied force is not limited to tensile force, and rather that compressive force or any other suitable force is within the scope and spirit of the present disclosure.

As discussed, weight 110 is connected to a rotor blade component. In exemplary embodiments as illustrated, loading assembly 102 further includes a connector 112 which connects the weight 110 and rotor blade component. Connector 112 may be formed from or include any suitable material, such as a yarn or fabric, a polymer, a metal, etc. In some embodiments, connector 112 may for example be a generally rigid component, such as a bar or linkage. In other embodiments, connector 112 may for example be a generally non-rigid component, such as a chord, chain, cable, etc. Connector 112 may extend between and be connected at respective ends to the weight 110 and rotor blade component.

In some embodiments, as illustrated in FIGS. 3, 4 and 6, loading assembly 102 may further include a ratchet 114. The weight 110 may be movable relative to the ratchet 114, such as towards the tip 32. Weight 110 may be movable within the ratchet 114 as illustrated, or for example may movably surround the ratchet 114. For example, as illustrated, ratchet 114 may generally surround the weight 110. Ratchet 114 may further include teeth 116, which may generally mate with teeth 118 of the weight 110. Interaction between the teeth 116, 118 may allow movement of the weight 110 in one direction but prevent movement in another. For example, in exemplary embodiments as illustrated, ratchet 114 may allow movement of the weight 110 towards the tip 32, and prevent movement towards the root 34. Accordingly, during operation, the bias on weight 110 may cause movement of the weight 110 towards the tip 32, such as in some embodiments when creep has occurred to the rotor blade component. This movement may, for example, re-tension the rotor blade component. Movement of the weight 110 towards the root 34, however, may be prevented by the ratchet 114.

In other embodiments, as illustrated in FIG. 5, loading assembly 102 may further include a tube 120. The weight 110 may be movable within the tube 120, such as towards and away from the tip 32. The inner surface of the tube 120 and the outer surface of the weight 110 may, for example, have relatively smooth surfaces, to facilitate sliding of the weight 110 within the tube 120. The inner cross-sectional profile of the tube 120 may, for example, generally correspond to the outer cross-sectional profile of the weight 110, so that the weight 110 can slide generally smoothly therein. During operation, the bias on weight 110 may cause movement of the weight 110 towards the tip 32, such as in some embodiments when creep has occurred to the rotor blade component. This movement may, for example, re-tension the rotor blade component. Tube 120 may additionally, however, allow movement of the weight 110 towards the root 34, such as when the centrifugal force is not strong enough to bias the weight towards the tip 32.

In still other embodiments, loading assembly 102 may further include a rail system or a rod. The weight 110 may be movable about the rod or along the rail system, such as towards and away from the tip 32. During operation, the bias on weight 110 may cause movement of the weight 110 towards the tip 32, such as in some embodiments when creep has occurred to the rotor blade component. This movement may, for example, re-tension the rotor blade component. The rod or rail system may additionally, however, allow movement of the weight 110 towards the root 34, such as when the centrifugal force is not strong enough to bias the weight towards the tip 32.

In some embodiments, as illustrated in FIG. 6, loading assembly 102 may further include a pulley 122. The pulley 122 may be operable to modify a direction of the application of the force to the rotor blade component by the weight 110. For example, in some embodiments, pulley 122 may reverse the direction of the application of the force. As illustrated, connector 112 may wrap around pulley 122, and then be connected to a rotor blade component. Accordingly, movement of the weight towards the tip 32 may, due to the positioning of the connector 112 and pulley 122, cause an application of force to the rotor blade component away from the tip 32 and towards the root 34. Pulley 122 may, for example, be disposed in the root segment 54 as illustrated or in any other suitable location. Pulley 122 may be utilized to modify the direction of the application of force by the weight 110 in any suitable direction, as desired or required for a particular rotor blade component and particular application.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly, comprising:
   a rotor blade having exterior surfaces defining a pressure side, a suction side, a leading edge and a trailing edge each extending between a tip and a root, the rotor blade defining a span and a chord, the exterior surfaces defining an interior of the rotor blade; and
   a loading assembly, the loading assembly comprising a weight disposed within the interior and movable generally along the span of the rotor blade, the weight connected to a rotor blade component such that movement of the weight towards the tip causes application of a force to the rotor blade component by the weight, the loading assembly further comprising a ratchet wherein the weight is movable relative to the ratchet towards the tip or further comprising a pulley operable to modify a direction of the application of the force blade component by the weight,
   wherein centrifugal force due to rotation of the rotor blade biases the weight towards the tip.

2. The rotor blade assembly of claim 1, wherein the loading assembly further comprises a ratchet wherein the weight is movable relative to the ratchet towards the tip and further comprises a pulley operable to modify a direction of the application of the force to the rotor blade component by the weight.

3. The rotor blade assembly of claim 1, wherein the loading assembly further comprises a connector connecting the weight and the rotor blade component.

4. The rotor blade assembly of claim 1, wherein the force is a tensile force.

5. The rotor blade assembly of claim 1, wherein the rotor blade comprises a tip segment comprising the tip, a root segment comprising the root, and an intermediate segment between the tip segment and the root segment.

6. The rotor blade assembly of claim 5, wherein the weight is disposed within the tip segment.

7. The rotor blade assembly of claim 5, wherein the intermediate segment comprises a fabric and a plurality of structural members.

8. The rotor blade assembly of claim 7, wherein the rotor blade component is the fabric.

9. The rotor blade assembly of claim 7, wherein the rotor blade component is one of the plurality of structural members.

10. A rotor blade assembly, comprising:
    a rotor blade having exterior surfaces defining a pressure side, a suction side, a leading edge and a trailing edge each extending between a tip and a root, the rotor blade defining a span and a chord, the exterior surfaces defining an interior of the rotor blade, the rotor blade further comprising a tip segment comprising the tip, a root segment comprising the root, and an intermediate segment between the tip segment and the root segment, the intermediate segment comprising a fabric and a plurality of structural members; and
    a loading assembly, the loading assembly operable to tension the intermediate segment during rotation of the rotor blade, the loading assembly comprising a ratchet.

11. The rotor blade assembly of claim 10, wherein the loading assembly comprising a weight disposed within the interior and movable generally along the span of the rotor blade, the weight connected to one of the fabric or one of the plurality of structural members such that movement of the weight towards the tip causes application of a tensile force to the one of the fabric or one of the plurality of structural members by the weight, wherein centrifugal force due to rotation of the rotor blade biases the weight towards the tip.

12. The rotor blade assembly of claim 11, wherein the weight is movable relative to the ratchet towards the tip.

13. The rotor blade assembly of claim 11, wherein the loading assembly further comprises a connector connecting the weight and the rotor blade component.

14. The rotor blade assembly of claim 11, wherein the weight is disposed within the tip segment.

15. A wind turbine, comprising:
a tower;
a nacelle mounted on the tower; and
a plurality of rotor blades, each of the plurality of rotor blades having exterior surfaces defining a pressure side, a suction side, a leading edge and a trailing edge each extending between a tip and a root, each of the plurality of rotor blades defining a span and a chord, the exterior surfaces of each of the plurality of rotor blades defining an interior of each of the plurality of rotor blades; and
a loading assembly, the loading assembly comprising a weight disposed within the interior of one of the plurality of rotor blades and movable generally along the span of the one of the plurality of rotor blades, the weight connected to a rotor blade component such that movement of the weight towards the tip causes application of a force to the rotor blade component by the weight, the loading assembly further comprising a ratchet wherein the weight is movable relative to the ratchet towards the tip or further comprising a pulley operable to modify a direction of the application of the force to the rotor blade component by the weight,
wherein centrifugal force due to rotation of the one of the plurality of rotor blades biases the weight towards the tip.

16. The wind turbine of claim 15, wherein the loading assembly further comprises a ratchet wherein the weight is movable relative to the ratchet towards the tip and further comprises a pulley operable to modify a direction of the application of the force to the rotor blade component by the weight.

17. The wind turbine of claim 15, wherein the rotor blade comprises a tip segment comprising the tip, a root segment comprising the root, and an intermediate segment between the tip segment and the root segment, and wherein the weight is disposed within the tip segment.

18. The wind turbine of claim 15, wherein the rotor blade comprises a tip segment comprising the tip, a root segment comprising the root, and an intermediate segment between the tip segment and the root segment, and wherein the intermediate segment comprises a fabric and a plurality of structural members.

* * * * *